(12) United States Patent
Jain et al.

(10) Patent No.: US 8,855,022 B2
(45) Date of Patent: *Oct. 7, 2014

(54) METHOD AND SYSTEM FOR INCREASING THROUGHPUT IN A HIERARCHICAL WIRELESS NETWORK

(75) Inventors: Praval Jain, New Delhi (IN); Prashant Aggarwal, New Delhi (IN)

(73) Assignee: Virtualwire Technologies Private Limited, New Delhi (IN)

( * ) Notice: Subject to any disclaimer, the term of this patent is extended or adjusted under 35 U.S.C. 154(b) by 0 days.

This patent is subject to a terminal disclaimer.

(21) Appl. No.: 13/243,810

(22) Filed: Sep. 23, 2011

(65) Prior Publication Data

US 2012/0082035 A1 Apr. 5, 2012

Related U.S. Application Data

(63) Continuation of application No. 12/176,681, filed on Jul. 21, 2008, now abandoned.

(30) Foreign Application Priority Data

Jun. 12, 2008 (IN) .......................... 1996/DEL/2008

(51) Int. Cl.
| | |
|---|---|
| H04L 12/28 | (2006.01) |
| H04L 12/707 | (2013.01) |
| H04W 40/12 | (2009.01) |
| H04J 1/16 | (2006.01) |
| H04W 72/04 | (2009.01) |

(52) U.S. Cl.
CPC ............... *H04W 40/12* (2013.01); *H04L 45/24* (2013.01); *H04W 72/04* (2013.01)

USPC ........... 370/256; 370/228; 370/252; 370/401; 370/389

(58) Field of Classification Search
CPC ....................................................... H04L 45/24
USPC .......... 370/256, 228, 252, 401, 389; 270/256, 270/228, 252, 401, 389

See application file for complete search history.

(56) References Cited

U.S. PATENT DOCUMENTS

| | | | |
|---|---|---|---|
| 7,107,265 B1 * | 9/2006 | Calvignac et al. | 1/1 |
| 2005/0245252 A1 * | 11/2005 | Kappes et al. | 455/423 |
| 2005/0259571 A1 * | 11/2005 | Battou | 370/217 |
| 2008/0232347 A1 * | 9/2008 | Chao et al. | 370/351 |
| 2009/0147714 A1 * | 6/2009 | Jain et al. | 370/311 |
| 2009/0172189 A1 * | 7/2009 | Meier et al. | 709/238 |
| 2010/0080120 A1 * | 4/2010 | Bejerano et al. | 370/228 |

* cited by examiner

*Primary Examiner* — John Pezzlo
(74) *Attorney, Agent, or Firm* — Kenealy Vaidya LLP

(57) ABSTRACT

A method and system for increasing throughput in a hierarchical wireless network is described. The hierarchical wireless network includes a plurality of nodes and each of the plurality of nodes has a primary path to the root node. First, one or more channels from a plurality of available channels are allocated to each disjoint sub-tree associated with the root node. Then, alternate one or more disjoint paths from at least one node in the plurality of nodes to the root node through alternate disjoint sub-trees associated with the root node are determined. Next, data from the at least one node is sent to the root node through a primary path and one or more alternate disjoint paths.

18 Claims, 12 Drawing Sheets

| NODE ID | TREE ID | TRAFFIC INFORMATION |
|---|---|---|
| F1 | 1 | 40% |
| | 2 | 60% |
| G1 | 2 | 90% |
| | 3 | 10% |
| I1 | 3 | 100% |

FIG. 9

| NODE ID | NEXT HOP NEIGHBOR |
|---|---|
| A1 | A1 |
| B1 | B1 |
| C1 | C1 |
| D1 | A1 |
| E1 | A1 |
| F1 | A1 |
| G1 | B1 |
| G1 | C1 |
| H1 | C1 |
| I1 | C1 |
| J1 | A1 |
| K1 | A1 |
| L1 | A1 |
| M1 | A1 |
| N1 | A1 |
| N1 | B1 |
| O1 | A1 |
| O1 | B1 |
| P1 | A1 |
| Q1 | A1 |

FIG. 10

METHOD AND SYSTEM FOR INCREASING THROUGHPUT IN A HIERARCHICAL WIRELESS NETWORK

FIELD OF THE DISCLOSURE

This application is a continuation under 35 U.S.C. §120 of U.S. patent application Ser. No. 12/176,681, filed on Jul. 21, 2008 now abandoned, which claims the priority benefit under 35 U.S.C. §119 of Indian Patent Application No. 1996/DEL/2008 filed on Jun. 12, 2008, both of which are hereby incorporated in their entireties by reference.

The present disclosure relates generally to hierarchical wireless networks and more particularly to methods and systems for increasing throughput in hierarchical wireless networks.

BACKGROUND

Throughput is an important parameter that network designers want to maximize while designing hierarchical wireless networks. Conventionally, throughput is increased by using power control or by using directional antennas. Throughput is increased by controlling the power at which a node transmits. This reduces the area that is blocked out by transmission by the node; therefore, more concurrent transmissions can be done in the same area by working with reduced transmission power. However this approach leads to weak links and high data loss since power levels are low. Throughput may be increased by deploying directional antennas. Directional Antennas reduce the area blocked by a particular RF transmission by directing the transmission in a particular direction. Therefore, other nodes can continue transmissions that are not conflicting spatially. However, this method requires either accurate alignment between the transmitter and receiver antenna or multiple antennas whose input can be controlled to form a beam.

These problems have often been mitigated by using multiple non-interfering channels for transmission. Multiple non-interfering channels allow simultaneous transmissions which are proportional to the number of channels in use thereby increasing throughput. Such hierarchical wireless networks involve an initial negotiation phase during which nodes of the hierarchical wireless networks negotiate the channels to use for subsequent data transmission. The negotiations are done on a control channel or a default channel. Such an approach drastically impacts bandwidth usage on a channel. Further, in some such hierarchical wireless networks neighbor information is passed to a root node where root node calculates channels to be used by nodes and then sends back the information to the nodes. The calculations that are done at the root node are complex and may consume a considerable amount of time. Such an approach impacts the efficiency of the network. Moreover, nodes in such hierarchical wireless networks use multiple radios for communicating on multiple channels to take care of control signals and data signals. Such an approach may impact the costs involved in utilizing the hierarchical wireless network.

Accordingly, there is a need for a method and system for increasing throughput in a hierarchical wireless network which uses multiple channels and also addresses at least some of the shortcomings of past and present techniques of communication between wireless devices.

SUMMARY

The present invention is directed to a method and system for increasing throughput in a hierarchical wireless network. The hierarchical wireless network uses multiple channels along with multi-paths for transmission of data to increase the throughput. Further, the hierarchical wireless network minimizes route coupling while transmitting data.

One aspect of the present invention is to increase throughput in a hierarchical wireless network by sending data from the nodes to root node through multiple paths. Load balancing is also performed over the multiple paths while sending data through the multiple paths.

Another aspect of the present invention is to increase throughput in a hierarchical wireless network by sending data from the nodes to root node on multiple channels using one or more transceivers at the nodes.

Yet another aspect of the present invention is to increase throughput in a hierarchical wireless network by sending data from nodes to root node on multiple channels and minimizing effects of route coupling.

To achieve the foregoing objectives, in one embodiment a method for increasing throughput in a hierarchical wireless network is provided. In accordance with this method, the hierarchical wireless network includes a plurality of nodes and each of the plurality of nodes has a primary path to the root node. The method includes allocating one or more channels from a plurality of available channels to each disjoint sub-tree associated with the root node. Next, alternate one or more disjoint paths from at least one node in the plurality of nodes to the root node through alternate disjoint sub-trees associated with the root node are determined. Data from the at least one node is then sent to the root node through a primary path and one or more alternate disjoint paths.

In accordance with another embodiment of the present invention, a method for increasing throughput in a hierarchical wireless network is provided. In accordance with this method, the hierarchical wireless network includes a plurality of nodes and each of the plurality of nodes has a primary path to the root node. In accordance with one embodiment, the root node allocates one or more channels from a plurality of available channels to each disjoint sub-tree associated with the root node. In accordance with another embodiment, the root node allocates a unique channel to each disjoint sub-tree associated with the root node. The root node further re-allocates a channel allocated to a disjoint sub-tree associated with the root node, to another disjoint sub-tree associated with the root node based on traffic load on the channels.

In accordance with another embodiment of the present invention, a method for increasing throughput in a hierarchical wireless network is provided. The hierarchical wireless network includes a plurality of nodes and each of the plurality of nodes has a primary path to the root node. One or more channels are allocated to one or more nodes within a disjoint sub-tree associated with the root node. Further, a channel allocated to a first node in a disjoint sub-tree is re-allocated to a second node in the disjoint sub-tree. The first node and the second node use optimum transmission power level to transmit signals such that they are substantially out of radio range of each other.

In accordance with another embodiment of the present invention, a wireless node is disclosed. The wireless node includes at least one transceiver, a memory module and a processing module. The at least one transceiver transmits and receives wireless signals. The wireless signals comprise beacons and sensed parametric data. Memory module stores a network level information. Processing module manages connections with other nodes based on the network.

In accordance with another embodiment of the present invention, a hierarchical wireless network is disclosed. The hierarchical wireless network includes one or more gateways and a plurality of nodes. The one or more gateways are capable of accumulating and forwarding data received from the plurality of nodes. The plurality of nodes forms one or more tree structures having the one or more gateways as root nodes. A tree structure includes a set of disjoint sub-trees associated with a root node. The nodes in each disjoint sub-tree are characterized by a unique tree ID.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention

FIG. 9 is an example route table for detecting route coupling at root node of a hierarchical wireless network in accordance with one embodiment of the present invention.

FIG. 10 is an example backward routing table for root node of a hierarchical wireless network in accordance with one embodiment of the present invention.

Figure 1:
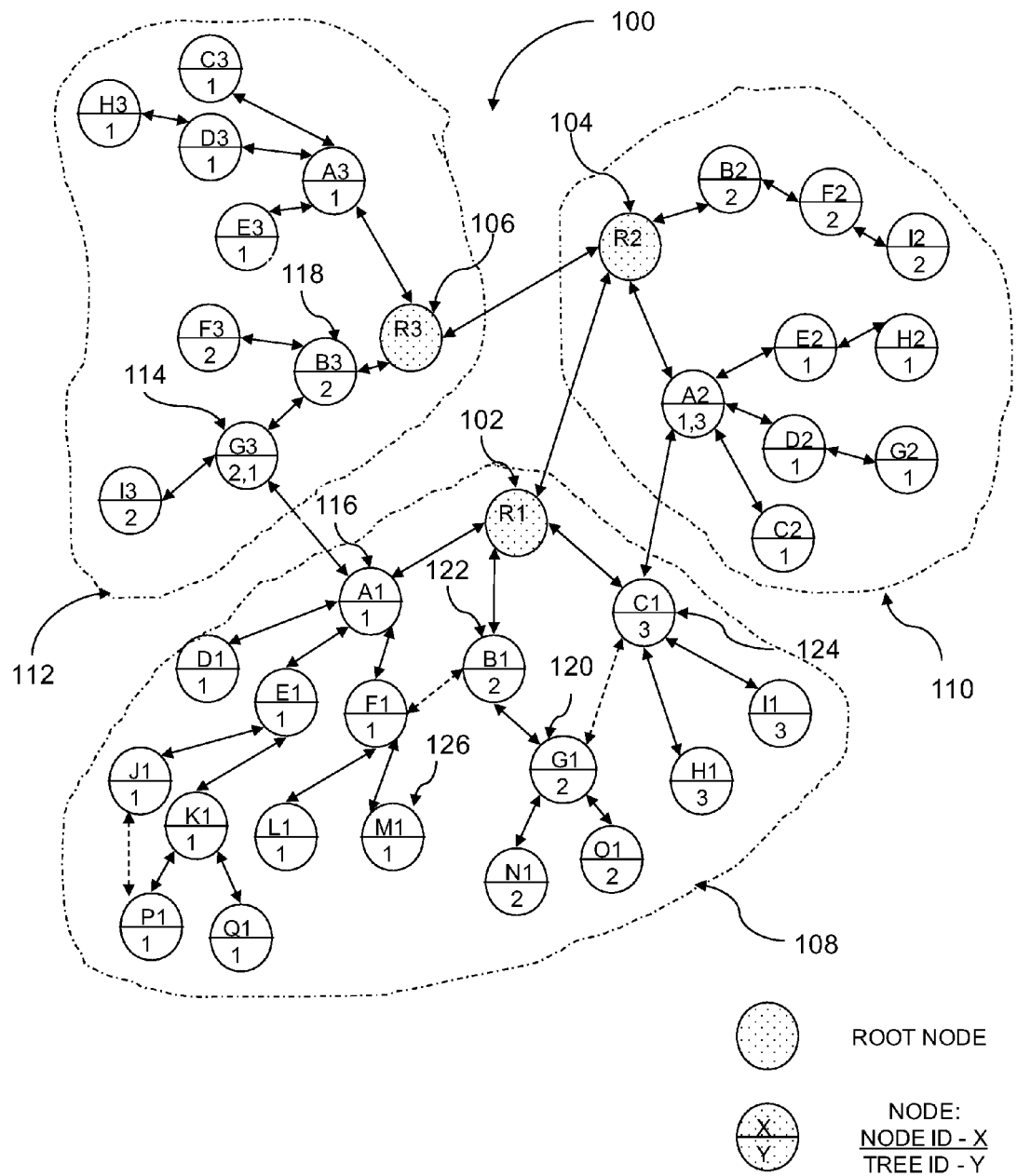
FIG. 1 is a block diagram illustrating a hierarchical wireless network in accordance with one embodiment of the present invention.

Those skilled in the art will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations and apparatus components related to Hierarchical Wireless Networks and nodes. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, and the like are used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

A method for increasing throughput in a hierarchical wireless network is described herewith. The hierarchical wireless network includes a plurality of nodes and each of the plurality of nodes has a primary path to the root node. First, one or more channels from a plurality of available channels are allocated to each disjoint sub-tree associated with the root node. Then, alternate one or more disjoint paths from at least one node in the plurality of nodes to the root node through alternate disjoint sub-trees associated with the root node are determined. Next, data from the at least one node is sent to the root node through a primary path and one or more alternate disjoint paths.

Referring now to the drawings, and in particular FIG. 1, a block diagram illustrating a hierarchical wireless network 100 in accordance with one embodiment of the present invention is described herewith. Hierarchical wireless network 100 includes gateways 102, 104 and 106, and a plurality of nodes denoted by circles but not all designated with reference numerals. Gateways 102, 104 and 106 are capable of accumulating and forwarding data. It should be readily understood by those of ordinary skill in the art that additional or fewer gateways may be there in hierarchical wireless network 100. Further, the number of nodes in the plurality of nodes can increase or decrease as the nodes enter and leave the hierarchical wireless network 100.

The plurality of nodes forms tree structures 108, 110 and 112, with gateway 102 as root node of tree structure 108, gateway 104 as root node of tree structure 110 and gateway 106 as root node of tree structure 112. Tree structures 108, 110 and 112 include nodes having parent-child relationships amongst each other. A node listens for beacons from a set of nodes that are within a communication range of the node. Beacons are explained in detail in conjunction with FIG. 12 below. The node then determines a network level information for each of the nodes within it's communication range using the beacons received from each of the set of nodes. The node determines a first parent node based on the network level information. Therefore, the node is associated with the first parent node and a set of child nodes. Further, each node has an associated tree ID. Tree IDs are explained in detail in conjunction with FIG. 1 below. In accordance with one embodiment of the present invention, a node is associated with two or more first parent nodes, where each first parent node corresponds to a different root node in a hierarchical wireless network. The node is further associated with two or more tree IDs corresponding to the two or more first parent nodes. Node 114 is associated with two first parent nodes, that is, node 116 and node 118. Node 116 corresponds to root node 102 and node 118 corresponds to root node 106. Node 114 is associated with tree ID 1 corresponding to root node 102. Also, node 114 is associated with tree ID 2 corresponding to root node 106.

Further, a node may be associated with one or more secondary parent nodes. As shown in FIG. 1, associations between nodes and corresponding first parent nodes are represented by solid arrows, whereas associations between nodes and corresponding secondary parent nodes are represented by dotted arrows. Node 120 has a first parent node 122 and a secondary parent node 124. After a node gets associated with a first parent node, it starts sending its own beacon so that other nodes may associate with it and become its child nodes.

Figure 2:
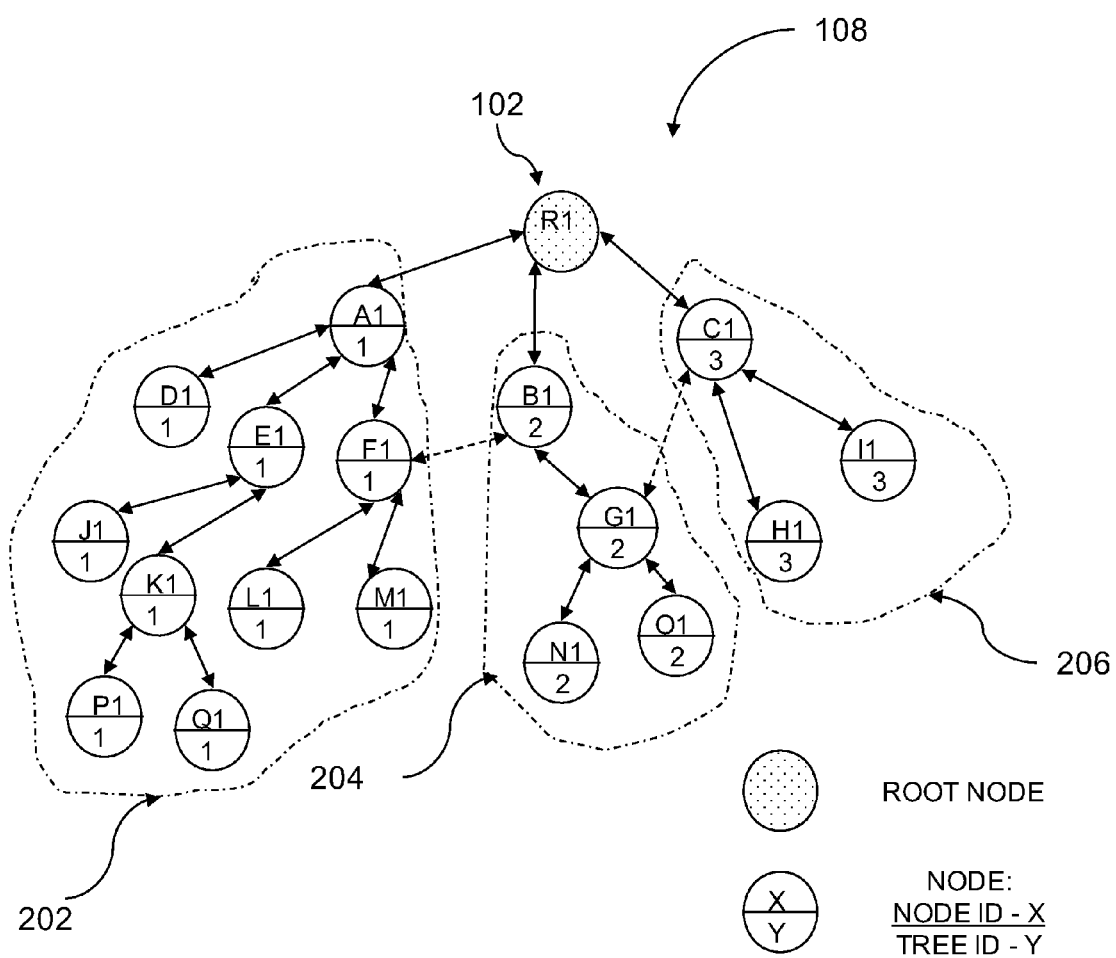
FIG. 2 is a block diagram illustrating a part of a hierarchical wireless network in accordance with one embodiment of the present invention.

Turning now to FIG. 2, a block diagram illustrating tree structure 108 of hierarchical wireless network 100 in accordance with one embodiment of the present invention is described herewith. Tree structure 108 includes disjoint sub-trees 202, 204 and 206. Disjoint sub-trees 202, 204 and 206 are associated with gateway 102. In the following paragraphs, we will refer to gateway 102 as root node 102. Each of the disjoint sub-trees 202, 204 and 206 is characterized by a unique tree ID. Disjoint sub-tree 202 is characterized by tree ID 1, disjoint sub-tree 204 is characterized by tree ID 2 and disjoint sub-tree 206 is characterized by tree ID 3.

Each node in the plurality of nodes is represented by a unique node ID. In an embodiment, node ID is Media Access Control (MAC) address of the node. Nodes are explained in detail in conjunction with FIG. 3 below.

Figure 3:
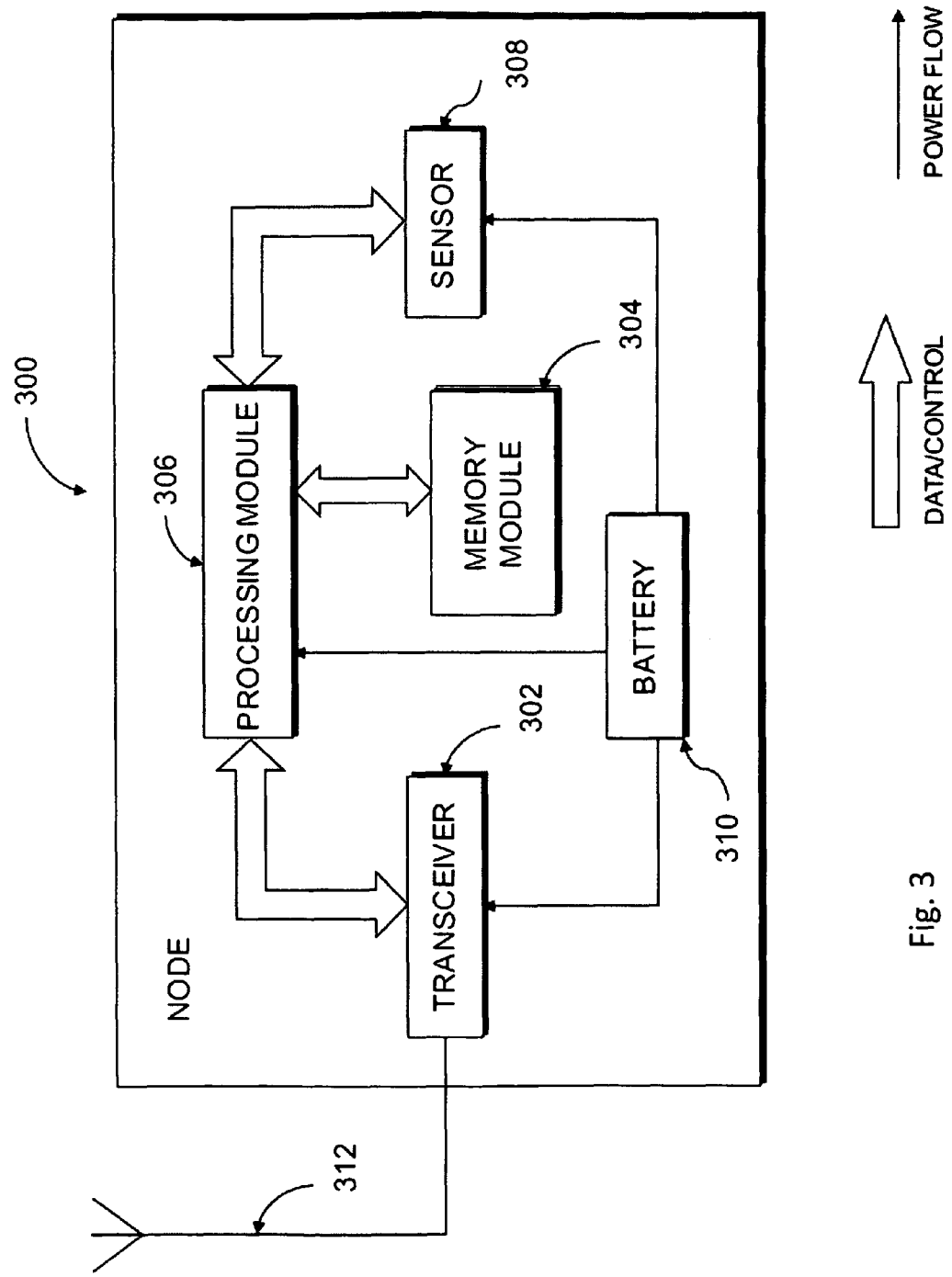
FIG. 3 is a block diagram illustrating a node of a hierarchical wireless network in accordance with one embodiment of the present invention.

Turning now to FIG. 3, a block diagram illustrating a node 300 of hierarchical wireless network 100 in accordance with one embodiment of the present invention is described herewith. Node 300 includes a transceiver 302, a memory module 304 and a processing module 306, a sensor 308, a battery 310 and an antenna 312. Transceiver 302 is configured for transmitting and receiving wireless signals using antenna 312. In some embodiments, node 300 includes two or more transceivers. Wireless signals include, but are not limited to, beacons and sensed parametric data. Beacons are explained in detail in conjunction with FIG. 12 below. Memory module 304 is configured for storing network level information. The network level information includes, but is not limited to, one or more of number of children of the node, number of parents of the node, traffic information at the node, hop count of the node, received signal strength indication (RSSI) at the node, one or more channels being used for data transmission, one or more tree IDs associated with the node, queue length of the node, backward routing table and power level used for transmission.

Processing module 306 is configured for managing connections with other nodes based on the hierarchical wireless network. In some embodiments, sensor 308 provides sensed parametric data. Battery 310 provides power to transceiver 302, processing module 306 and sensor 308.

Figure 4:
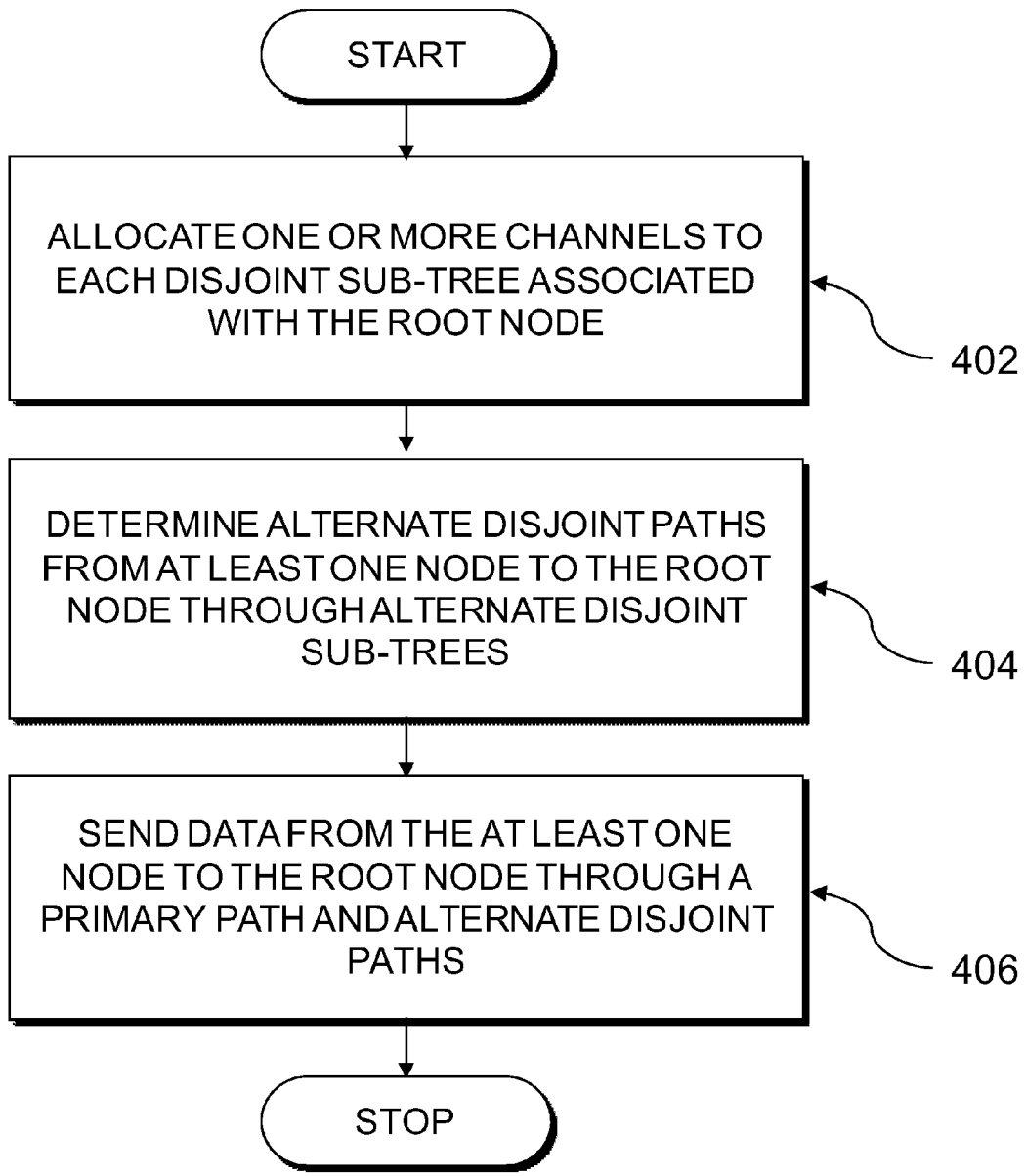
FIG. 4 is a flowchart illustrating a method for increasing throughput in a hierarchical wireless network in accordance with one embodiment of the present invention.

Turning now to FIG. 4, a flowchart illustrating a method for increasing throughput in hierarchical wireless network 100 in accordance with one embodiment of the present invention is described herewith. Hierarchical wireless network 100 includes a plurality of nodes. Each of the plurality of nodes has a primary path to a root node. Each of the plurality of nodes in tree structure 108 has a primary path to root node 102. In FIG. 4, the process begins at 402, where one or more channels from a plurality of available channels are allocated to each disjoint sub-tree 202, 204 and 206 associated with root node 102. The plurality of available channels includes, but is not limited to, time division channels, frequency division channels, code division channels, and combinations thereof.

In some embodiments, a unique channel is allocated to each disjoint sub-tree 202, 204 and 206. In some embodiments, a channel allocated to a disjoint sub-tree, from disjoint sub-trees 202, 204 and 206, is re-allocated to another disjoint sub-tree from disjoint sub-trees 202, 204 and 206. This is explained in detail in conjunction with FIG. 5 below. In some embodiments, one or more channels from the plurality of available channels are allocated to one or more nodes within a disjoint sub-tree from disjoint sub-trees 202, 204 and 206. This is explained in detail in conjunction with FIGS. 6, 7 and 8 below.

Next, at 404, one or more alternate disjoint paths are determined from one or more nodes in the plurality of nodes to root node 102 through alternate disjoint sub-trees associated with root node 102. As shown in FIG. 1, node 120 has a primary path to root node 102 through node 122 and an alternate disjoint path through node 124. In some embodiments, coupling is determined between two or more paths in a plurality of paths based on traffic information received at root node 102. The plurality of paths includes the primary path and the one or more alternate disjoint paths. Traffic information includes information regarding the disjoint trees followed by data to reach the root node from the plurality of nodes. This is explained in detail in conjunction with FIG. 9 below.

Thereafter, at 406, data is sent from the one or more node to root node 102 through a primary path and one or more alternate disjoint paths. Node 120 sends data to root node 102 through node 122 and also through node 124. In some embodiments, data is sent through a particular disjoint sub-tree from disjoint sub-trees 202, 204 and 206 associated with root node 102 by specifying the tree ID of the particular disjoint sub-tree in the data packet.

In some embodiments, load balancing is performed over the primary path and the one or more alternate disjoint paths to send data based on traffic information and queue length of immediate parent of the node. In accordance with an embodiment, traffic information is the amount of traffic being handled by the path. A node includes traffic information in its beacon signals. Beacon signals are explained in detail in conjunction with FIG. 12 below. In some embodiments, queue length is passed by a parent node to a child node in an acknowledgement message that the parent node sends to the child node after receiving a data packet from the child node.

In accordance with one embodiment of the present invention, node 120 is required to send 10 packets to root node 102. Node 120 receives beacons from node 122, node 124 and node 126. Node 120 uses the beacons to determine the number of packets forwarded by each of the path through node 122, path through node 124 and path through node 126 in the last beacon period (LBP). Path through node 122 forwarded 60 packets in the LBP, as represented by equation given below:

$$\text{Number of packets forwarded by path through node } 122\, (^{LBP}\text{Num}_{122}) = 60$$

Path through node 124 forwarded 70 packets in the LBP, as represented by equation given below:

$$\text{Number of packets forwarded by path through node } 124\, (^{LBP}\text{Num}_{124}) = 70$$

Path through node 126 forwarded 50 packets in the LBP, as represented by equation given below:

$$\text{Number of packets forwarded by path through node } 126\, (^{LBP}\text{Num}_{126}) = 50$$

Thereafter, node 120 determines percentage of packets and number of packets to be sent in the current beacon period (CBP) by each of the path through node 122, path through node 124 and path through node 126. The percentage of packets to be sent by path through node 122 in CBP is determined as described by equation given below:

Percentage of packets to be sent by path through node 122 in CBP $(^{CBP}Per_{122}) = (^{LBP}Num_{124} + {}^{LBP}Num_{126}) / (^{LBP}Num_{122} + {}^{LBP}Num_{124} + {}^{LBP}Num_{126}) \times 100/2$ $^{CBP}Per_{122} = (70+50)/(60+70+50) \times 100/2 = 33\%$ Therefore, based on traffic, node 120 determines number of packets to be sent by path through node 122 ($^{Traffic}Pac_{122} = {}^{CBP}Per_{122}$ of total number of packets to be sent=33% of 10=3.

Therefore, $^{Traffic}Pac_{122} = 3$

Similarly, node 120 determines the percentage of packets to be sent by path through node 124 in CBP as described by equation given below:

Percentage of packets to be sent by path through node 124 in CBP $(^{CBP}Per_{124}) = (^{LBP}Num_{122} + {}^{LBP}Num_{126}) / (^{LBP}Num_{122} + {}^{LBP}Num_{124} + {}^{LBP}Num_{126}) \times 100/2$ $^{CBP}Per_{124} = (60+50)/(60+70+50) \times 100/2 = 31\%$ Therefore, based on traffic, node 120 determines number of packets to be sent by path through node 124 ($^{Traffic}Pac_{124}) = {}^{CBP}Per_{124}$ of total number of packets to be sent=31% of 10=3.

Therefore, $^{Traffic}Pac_{124} = 3$

Similarly, node 120 determines the percentage of packets to be sent by path through node 126 in current beacon period as described by equation given below:

Percentage of packets to be sent by path through node 126 in CBP $(^{CBP}Per_{126}) = (^{LBP}Num_{122} + {}^{LBP}Num_{124}) / (^{LBP}Num_{122} + {}^{LBP}Num_{124} + {}^{LBP}Num_{126}) \times 100/2$ $^{CBP}Per_{126} = (60+70)/(60+70+50) \times 100/2 = 36\%$ Therefore, based on traffic, node 120 determines number of packets to be sent by path through node 126 ($^{Traffic}Pac_{126}) = {}^{CBP}Per_{126}$ of total number of packets to be sent=36% of 10=3.

Therefore, $^{Traffic}Pac_{126} = 3$.

Further, node 120 uses beacons & acknowledgments received to determine current queue length (CQL) at the node 122, node 124 and node 126.

Node 122 has a CQL of 3 packets, as represented by equation given below:

CQL at node 122 ($CQL_{122}$)=3,

Node 124 has a CQL of 4 packets, as represented by equation given below:

CQL at node 124 ($CQL_{124}$)=4,

Node 126 has a CQL of 10 packets, as represented by equation given below:

CQL at node 126 ($CQL_{126}$)=10,

Next, node 120 determines percentage of queue filled for each of node 122, node 124 and node 126. The nodes in hierarchical wireless network 100 have maximum queue length (MQL) of 15.

Percentage of queue filled for node 122=$CQL_{122}$/MQL×100=3/15×100=20%

Percentage of queue filled for node 124=$CQL_{124}$/MQL×100=4/15×100=26%

Percentage of queue filled for node 126=$CQL_{126}$/MQL×100=10/15×100=66%

Thereafter, node 120 uses a scheme based on percentage of queue filled to determine number of packets to sent by each of path through node 122, path through node 124 and path through node 126. The scheme used by node 120 is described below:

If queue of a node "NODE" is less than 30% full, then increment $^{Traffic}Pac_{NODE}$ by 1, where, $^{Traffic}Pac_{NODE}$ is number of packets to be sent by path through a node "NODE", obtained based on traffic.

If queue of a node "NODE" is 31-60% full, then keep $^{Traffic}Pac_{NODE}$ same.

If queue of a node "NODE" is more than 60% full, then decrement $^{Traffic}Pac_{NODE}$ by 1.

Therefore, based on the scheme, node 120 determines number of packet to be sent by each of path through node 122, path through node 124 and path through node 126, as described by equations below:

Number of packets to sent by path through node 122=Increment $^{Traffic}Pac_{122}$ by 1=3+1=4

Number of packets to sent by path through node 124=Increment $^{Traffic}Pac_{124}$ by 1=3+1=4

Number of packets to sent by path through node 126=Decrement $^{Traffic}Pac_{126}$ by 1=3−1=2

Figure 5:
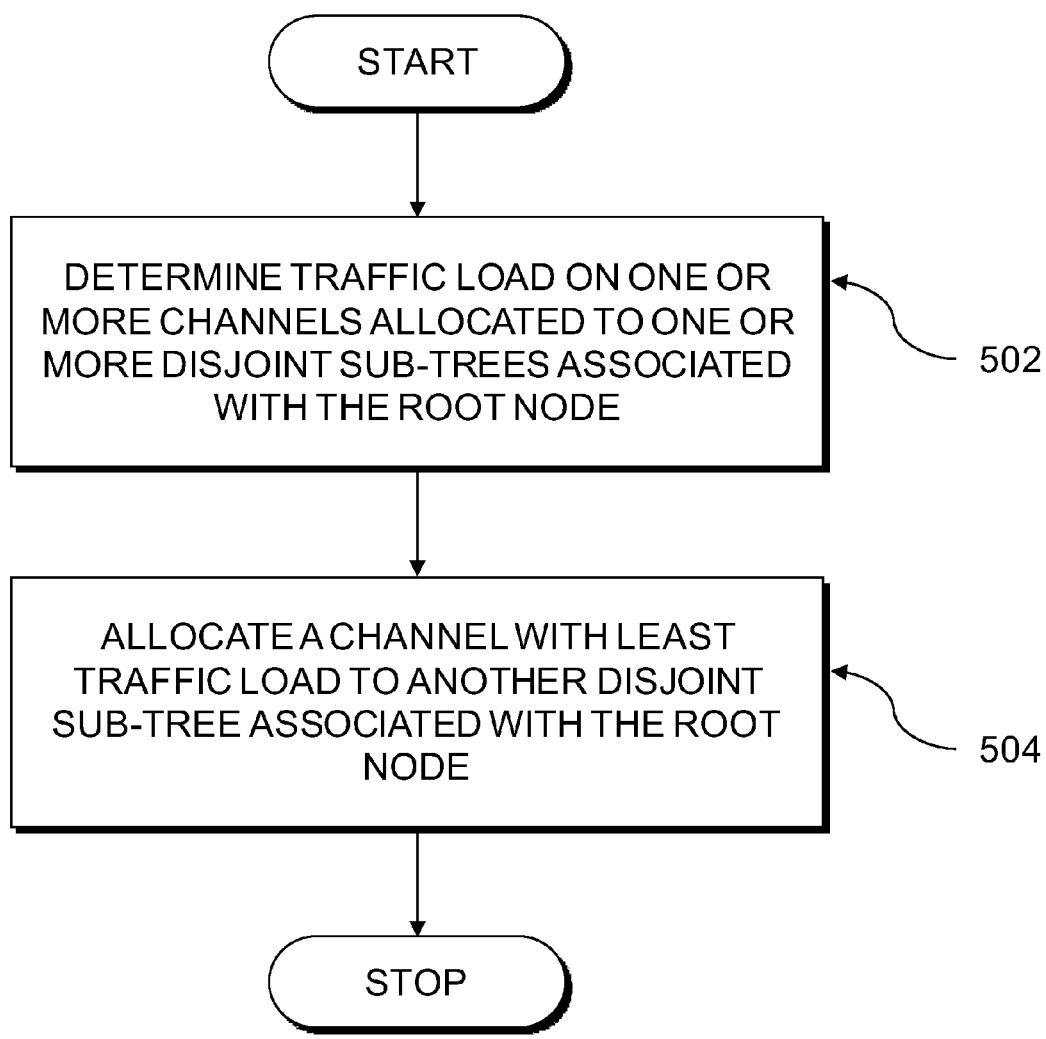
FIG. 5 is a flowchart illustrating a method for reallocating a channel allocated to a disjoint sub-tree to another disjoint sub-tree, in accordance with one embodiment of the present invention.

Turning now to FIG. 5, a flowchart illustrating a method for reallocating a channel allocated to a disjoint sub-tree to another disjoint sub-tree, in accordance with one embodiment of the present invention is described herewith. At 502, traffic load is determined on one or more channels allocated to one or more disjoint sub-trees 202, 204 and 206 associated with root node 102. In some embodiments, traffic load on a channel is determined at root node 102 by obtaining number of data packets with a valid tree ID and multiplying the number of data packets obtained with hop count of source nodes of the data packets. Nodes store their hop count in the data packets before transmitting them. Thereafter, at 504, a channel with least traffic load is allocated to a disjoint sub-tree from disjoint sub-trees 202, 204 and 206.

Figure 6:
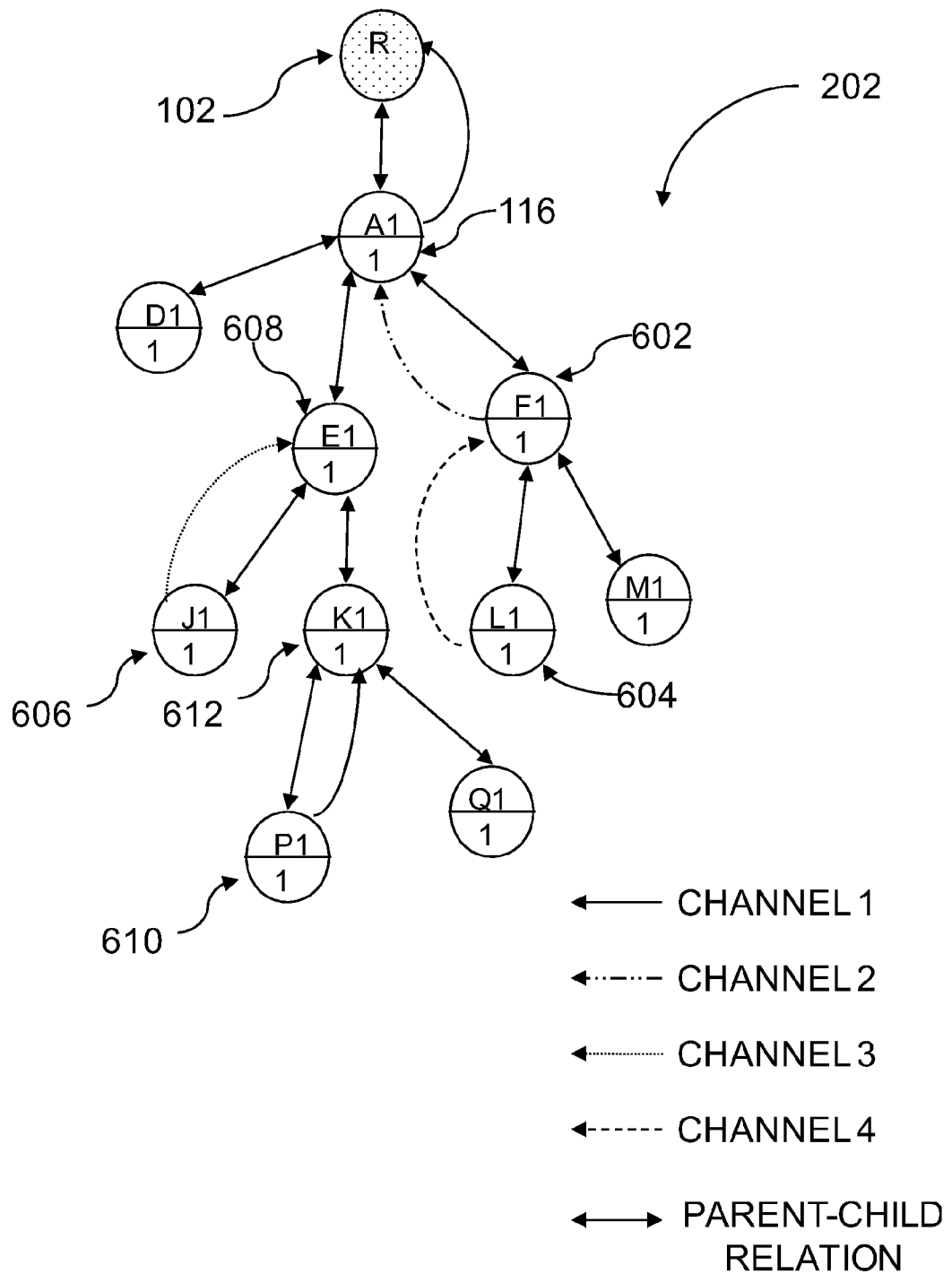
FIG. 6 is a block diagram illustrating a part of a hierarchical wireless network in accordance with one embodiment of the present invention.

Turning now to FIG. 6, a block diagram illustrating disjoint sub-tree 202 and root node 102 of hierarchical wireless network 100 in accordance with one embodiment of the present invention is described herewith. As shown in FIG. 6, nodes in disjoint sub-tree 202 use different channels to transmit data. This enables simultaneous transmission by nodes in disjoint sub-tree 202. Node 116 transmits data to root node 102 on channel 1. Node 602 transmits data to node 116 on channel 2. Node 604 transmits data to node 602 on channel 4. Node 606 transmits data to node 608 on channel 3. Node 610 transmits data to node 612 on channel 1.

In some embodiments, a channel allocated to a first node in disjoint sub-tree 202 is re-allocated to a second node in the disjoint sub-tree 202, where the first node and the second node are substantially out of radio range of each other. Node 610 is reusing channel 1 for transmitting data to node 612 as shown in FIG. 6. Typically, radio range of nodes will extend further than their first hop neighbors. This may restrict re-use of channels as a channel used by a node cannot be re-used by nodes in the radio range of the node. In some embodiments, power control is used to maintain an optimal radio range of each node. This is explained in detail in conjunction with FIGS. 7 and 8 below.

Figure 7:
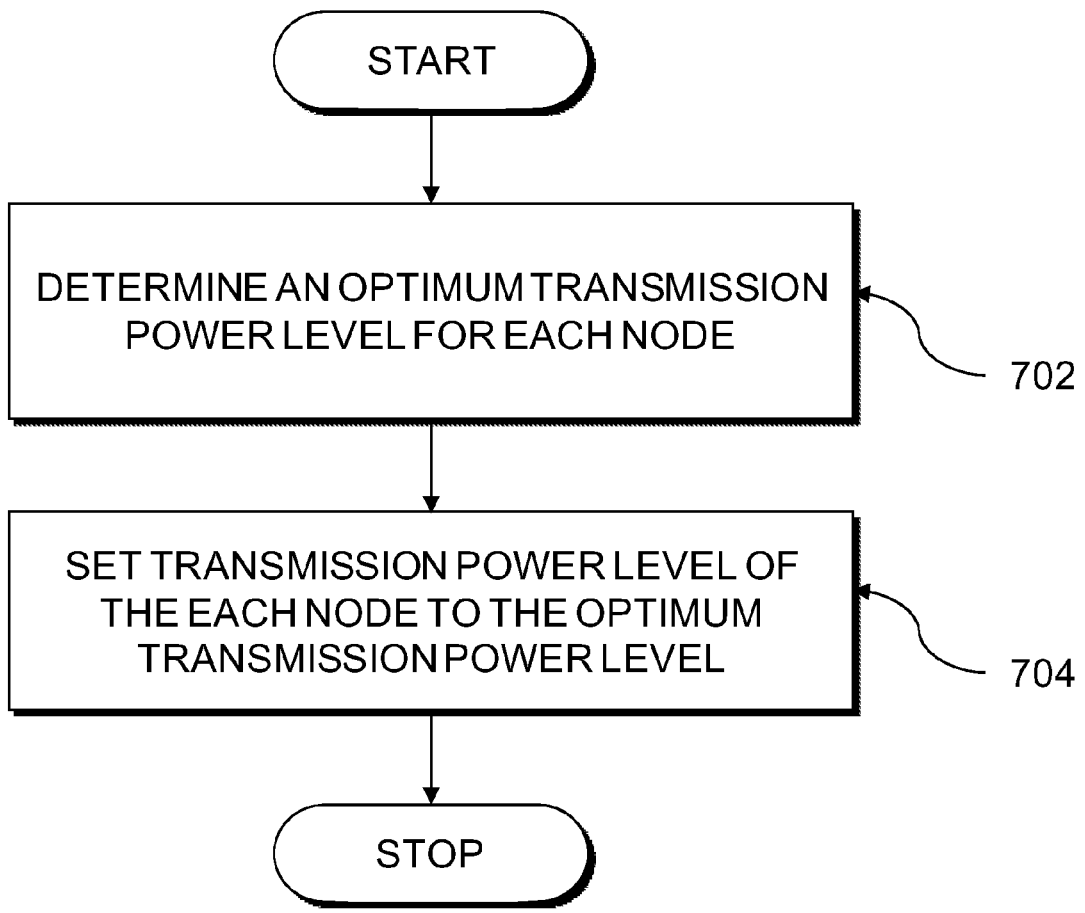
FIG. 7 is a flowchart illustrating a method for using power control to maintain an optimal radio range of each node in accordance with one embodiment of the present invention.

Turning now to FIG. 7, a flowchart illustrating a method for using power control to maintain an optimal radio range of each node in accordance with one embodiment of the present invention is described herewith. At 702, an optimum transmission power level is determined for each node. Optimum transmission power level between a first node in the plurality of nodes and a second node in the plurality of nodes is the power level required to maintain contact between the first node and second node. This is explained in detail in conjunction with FIG. 8 below. Thereafter, at 704, transmission power level of each node is set to the optimum transmission power level. This ensures that radio range of each node is restricted to two or less than two hops.

Figure 8:
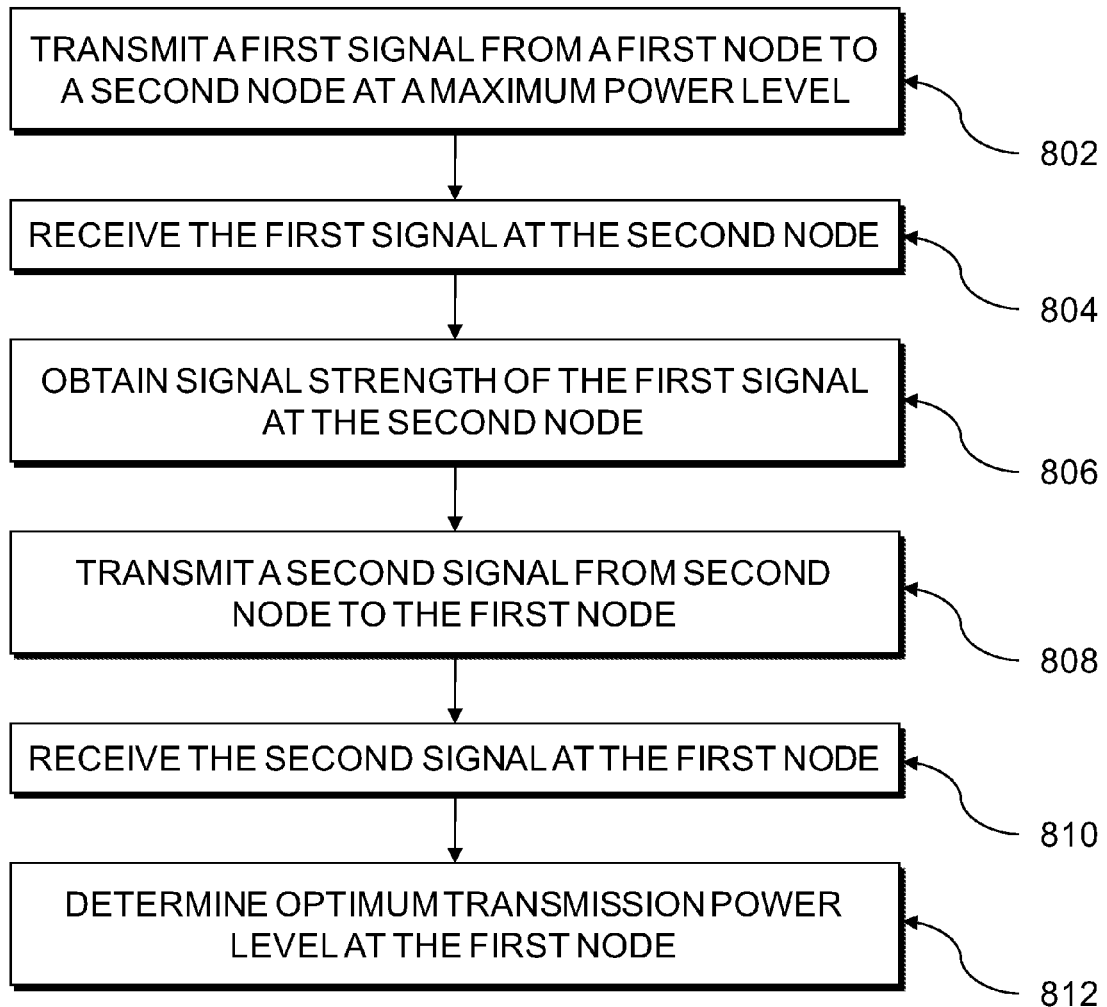
FIG. 8 is a flowchart illustrating a method for determining an optimum transmission power level for a node in a hierarchical wireless network in accordance with one embodiment of the present invention.

Turning now to FIG. 8, a flowchart illustrating a method for determining an optimum transmission power level for a node in a hierarchical wireless network in accordance with one embodiment of the present invention is described herewith. At 802, a first signal is transmitted from the first node to the second node at a maximum power level. The first signal is received at the second node at 804. Then, at 806, signal strength of the first signal is obtained at the second node. Next, at 808, a second signal is transmitted from the second node to the first node. The second signal includes the value of signal strength of the first signal at the second node. At 810, the second signal is received at the first node. Finally, an optimum transmission power level is determined at the first node based on the value of the signal strength of the first signal at 812. For future communication, the first node uses the optimum transmission power level to transmit signals to the second node. In an embodiment, method illustrated in FIG. 8 may be periodically re-run to determine an optimum transmission power level.

Turning now to FIG. 9, an example route table 900 for detecting route coupling, between two or more paths in a plurality of paths, at a root node of hierarchical wireless network 100 in accordance with one embodiment of the present invention is described herewith. The plurality of paths includes a primary path and alternate one or more disjoint paths. Each path in the plurality of paths lies on a different disjoint sub-tree. The root node maintains route table 900 for detecting route coupling. Route table 900 includes three columns 902, 904 and 906. Column 902 lists node IDs F1, G1 and I1 of the nodes from where data is received at the root node. Column 904 lists one or more tree IDs corresponding to one or more paths used by each node F1, G1 and I1 to send data to the root node. Column 906 lists traffic information corresponding to the one or more paths used by each node F1, G1 and I1 to send data to the root node. The traffic information is the percentage of data that is received by the root node through the one or more paths from a particular node.

In accordance with an embodiment, the root node receives 40% data from node F1 on a path on sub-tree with tree ID 1 and 60% data on a path on sub-tree with tree ID 2, as shown in FIG. 9. The root node receives 90% data from node G1 on a path on sub-tree with tree ID 2 and 10% data on a path on sub-tree with tree ID 3. Further, the root node receives 100% data from node I1 on a path on sub-tree with tree ID 3. In the embodiment, the root node detects no route coupling corresponding to node I1 as 100% data is routed through one path. Further, the root note detects no route coupling corresponding to node G1 as considerable data, that is 90%, is routed along one path. However, the root node detects route coupling corresponding to node F1 as almost equal amount of data is routed along the two paths on sub-trees with tree IDs 1 and 2.

In some embodiments, after route coupling is detected between two paths, the channels used by the two paths are allocated such that the two paths are disjoint. Channels that are already allocated may be reallocated to the paths based on traffic information.

Turning now to FIG. 10, an example backward routing table 1000 for root node 102 of tree structure 108 of hierarchical wireless network 100 in accordance with one embodiment of the present invention is described herewith. Backward routing table 1000 is used to route data packets from root node 102 to nodes in tree structure 108. Backward routing table 1000 includes a column 1002 and a column 1004. Column 1002 lists the nodes in tree structure 108. Root node forms backward routing table 1000 by filling column 1004 while receiving data packets from the nodes in tree structure 108. When root node receives a data packet from a node listed in column 1002, it fills corresponding row in column 1004 with the first hop neighbor from which it received the packet.

Figure 11:
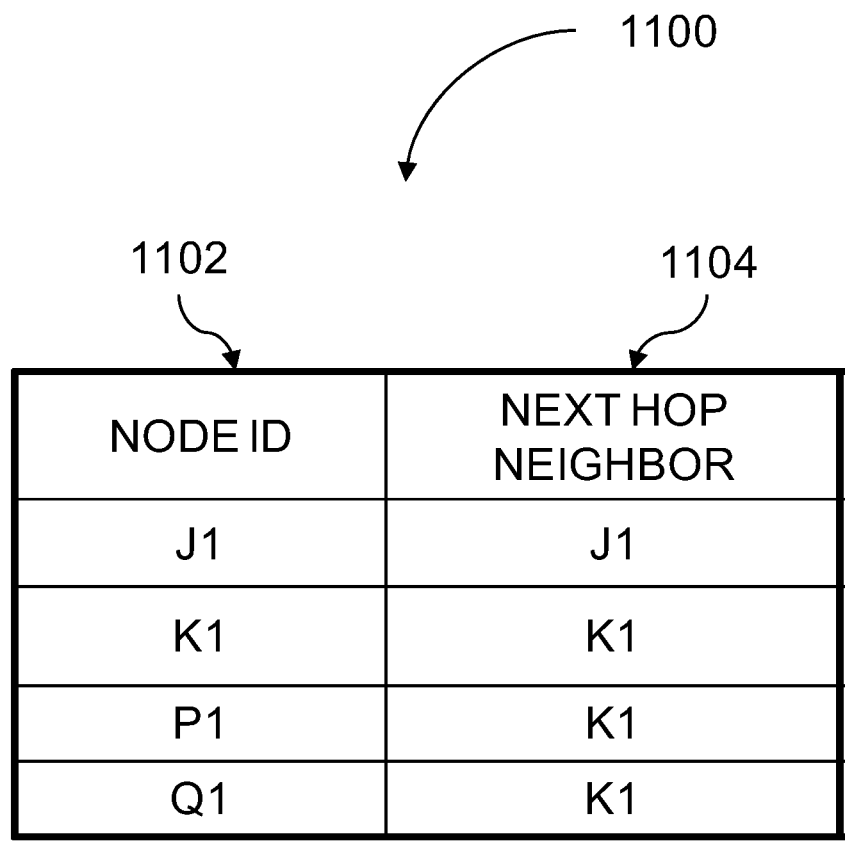
FIG. 11 is an example backward routing table for a node of a hierarchical wireless network in accordance with one embodiment of the present invention.

Turning now to FIG. 11, an example backward routing table 1100 for a node with node ID E1 of tree structure 108 of hierarchical wireless network 100 in accordance with one embodiment of the present invention is described herewith. Backward routing table 1100 is used by the node to route data packets from root node 102 to successor nodes of the node in tree structure 108. The successor nodes of the node include nodes with node IDs J1, K1, P1 and Q1. Backward routing table 1100 includes a column 1102 and a column 1104. Column 1102 lists the successor nodes of the node in tree structure 108. The node forms backward routing table 1100 by filling column 1104 while receiving data packets from the successor nodes of the node in tree structure 108. When the node receives a data packet from a node listed in column 1102, it fills corresponding row in column 1104 with the first hop neighbor from which it received the packet.

Figure 12:
FIG. 12 depicts a beacon packet of a hierarchical wireless network in accordance with one embodiment of the present invention.

Turning now to FIG. 12, a beacon packet 1200 of a node of hierarchical wireless network 100 in accordance with one embodiment of the present invention is described herewith. Beacon packets are transmitted by nodes periodically. Beacon packet 1200 of a node includes, but is not limited to, node ID 1202 of the node, number of children 1204 of the node, number of parents 1206 of the node, traffic information 1208 of the node, hop count 1210 of the node, channels used for data transmission 1212, RSSI 1214 of the node and minimum RSSI of the branch, tree ID 1216 of the node, queue length 1218 of the node and optimum transmission power level 1220 of the node.

Traffic information 1208 of a node is the amount of traffic handled by a path which includes the node. In accordance with an embodiment, a first hop node on a path handles 80 packets in a beacon period. This information is included in the beacon of the first hop node. A second hop node of the path on receiving this beacon, adds to this the number of packets it is handling locally, say 50. Therefore in its own beacon, the second hop node passes 130 as branch traffic. Further, it also sends its local traffic which is 50. Next hop node of the path may have only 20 packets to handle, so that it passes 150 as branch traffic and 20 as local traffic. In accordance with an embodiment, traffic information 1208 of a node includes the local traffic of the node and branch traffic of the node.

Beacon signals are periodically broadcasted from each node. The beacon signals comprise one or more beacon packets. A beacon signal includes network level information of the each node. In some embodiments, beacon signal is broadcast over a default channel. New nodes listen to beacon signals from one or more nodes over the default channel. New nodes join hierarchical wireless network 100 by selecting one or more nodes as parents based on network level information in the beacon signals received from the one or more nodes. When a new node associates with a first parent node, it sets its own tree ID as the tree ID of the parent node.

In some embodiments, beacon signal is broadcast using maximum power level available. Beacon signals may be used to determine an optimum transmission power level for each node. This is explained in detail in conjunction with FIG. 7 above.

In the foregoing specification, specific embodiments of the present invention have been described. However, it will be readily apparent to a person of ordinary skill in the art that various modifications can be made without departing from the scope of the invention as set forth in the claims below. Therefore, the foregoing specification and corresponding figures are to be regarded in an illustrative rather than a restrictive sense.

An Abstract of the Disclosure is provided to allow a reader to quickly ascertain the nature of the present invention. It should not be used to interpret or limit the scope or meaning of the claims.

What is claimed is:

1. A method for increasing throughput in a hierarchical wireless network, the hierarchical wireless network comprising a plurality of nodes, wherein each of the plurality of nodes has a primary path to a root node, the method comprising:
    allocating one or more channels from a plurality of available channels to each disjoint sub-tree associated with the root node;
    determining alternate one or more disjoint paths from at least one node in the plurality of nodes to the root node through alternate disjoint sub-trees associated with the root node; and
    sending data from the at least one node to the root node through a primary path and one or more alternate disjoint paths,
    wherein allocating one or more channels further comprises re-allocating a channel allocated to a disjoint sub-tree associated with the root node, to another disjoint sub-tree associated with the root node.

2. The method of claim 1, wherein allocating one or more channels comprises allocating a unique channel to each disjoint sub-tree associated with the root node.

3. The method of claim 1, wherein the re-allocating a channel comprises:
    determining traffic load on one or more channels allocated to one or more disjoint sub-trees associated with the root node; and
    allocating a channel with least traffic load to another disjoint sub-tree associated with the root node.

4. The method of claim 1, wherein allocating one or more channels further comprises allocating one or more channels to one or more nodes within a disjoint sub-tree associated with the root node.

5. The method of claim 4, wherein allocating one or more channels to one or more nodes comprises re-allocating a channel allocated to a first node in a disjoint sub-tree, to a second node in the disjoint sub-tree, wherein the first node and the second node are substantially out of radio range of each other.

6. The method of claim 4, wherein allocating one or more channels to one or more nodes further comprises:
    determining an optimum transmission power level for each node; and
    setting transmission power level of each node to the optimum transmission power level.

7. The method of claim 6, wherein determining an optimum transmission power level comprises:
    transmitting a first signal from a first node in the plurality of nodes to a second node in the plurality of nodes at a maximum power level;
    receiving the first signal at the second node;
    obtaining signal strength of the first signal at the second node;
    transmitting a second signal from second node to the first node, the second signal comprising the value of signal strength of the first signal at the second node;
    receiving the second signal at the first node; and
    determining optimum transmission power level at the first node based on the value of the signal strength of the first signal.

8. The method of claim 7, where optimum transmission power level between the first node and second node is the power level required to maintain contact between the first node and second node.

9. The method of claim 1, wherein allocating one or more channels further comprises determining coupling between two or more paths in a plurality of paths based on traffic information received at the root node, wherein the plurality of paths comprising the primary path and the alternate one or more disjoint paths, wherein traffic information comprising information regarding the disjoint trees followed by data to reach the root node from the plurality of nodes.

10. The method of claim 1, wherein sending data from the at least one node to the root node comprises performing load balancing over the primary path and the one or more alternate disjoint paths based on traffic information and queue length.

11. The method of claim 1, wherein sending data from the at least one node to the root node further comprises sending data through a particular disjoint sub-tree associated with the root node.

12. The method of claim 1, wherein the channels are selected from a group comprising time division channels, frequency division channels, code division channels, and combinations thereof.

13. The method of claim 1 further comprising maintaining backward routing tables at each node.

14. The method according to claim 1 further comprising periodically broadcasting a beacon signal from each node, wherein the beacon comprises network level information of the each node.

15. The method of claim 14, wherein the beacon signal is broadcast over a default channel.

16. The method of claim 14, wherein the beacon signal is broadcast using maximum power level available.

17. A wireless node comprising:
    at least one transceiver for transmitting and receiving wireless signals, wherein the wireless signals comprise beacons and sensed parametric data;
    a memory module for storing a network level information; and
    a processing module for managing connections with other nodes based on the network level information,
    wherein the network level information of a node in the plurality of nodes comprises at least one of number of children of the node, number of parents of the node, traffic information at the node, hop count of the node, received signal strength indication (RSSI) at the node, one or more channels being used for data transmission, one or more tree IDs associated with the node, queue length of the node and power level used for transmission, wherein a tree ID corresponds to a disjoint sub-tree associated with the root node.

18. A hierarchical wireless network comprising:
one or more gateways capable of accumulating and forwarding data;
a plurality of nodes forming one or more tree structures having the one or more gateways as root nodes, wherein a tree structure comprises:
a set of disjoint sub-trees associated with a root node, wherein nodes in each disjoint sub-tree are characterized by a unique tree ID.

* * * * *